United States Patent [19]
Greene et al.

[11] Patent Number: 5,930,256
[45] Date of Patent: Jul. 27, 1999

[54] SELF-ARBITRATING CROSSBAR SWITCH

[75] Inventors: Daniel H. Greene, Sunnyvale; Alan G. Bell, Palo Alto; Joseph B. Lyles, Mountain View, all of Calif.

[73] Assignee: Xerox Corporation, Stamford, Conn.

[21] Appl. No.: 08/829,649

[22] Filed: Mar. 28, 1997

[51] Int. Cl.$^6$ .................................................. H04L 12/56
[52] U.S. Cl. ........................ 370/397; 370/411; 370/427; 370/380
[58] Field of Search .................................... 370/360, 380, 370/387, 388, 389, 411, 413, 414, 418, 427, 415, 416, 417, 396, 397, 398, 399, 390

[56] References Cited

U.S. PATENT DOCUMENTS

| | | | |
|---|---|---|---|
| 4,891,802 | 1/1990 | Jasmer et al. | 370/416 |
| 4,933,933 | 6/1990 | Dally et al. | 370/406 |
| 5,105,424 | 4/1992 | Flaig et al. | 395/200.73 |
| 5,166,926 | 11/1992 | Cisneros et al. | 370/392 |
| 5,179,552 | 1/1993 | Chao | 370/60 |
| 5,274,642 | 12/1993 | Widiaja et al. | 370/411 |
| 5,305,310 | 4/1994 | Itoh et al. | 370/392 |
| 5,305,311 | 4/1994 | Lyles | 370/390 |
| 5,319,639 | 6/1994 | Gula | 370/427 |
| 5,325,356 | 6/1994 | Lyles | 370/397 |
| 5,327,420 | 7/1994 | Lyles | 370/397 |
| 5,367,518 | 11/1994 | Newman | 370/414 |
| 5,511,070 | 4/1996 | Lyles | 370/411 |
| 5,519,698 | 5/1996 | Lyles et al. | 370/411 |
| 5,590,123 | 12/1996 | Lyles et al. | 370/397 |
| 5,602,844 | 2/1997 | Lyles | 370/395 |
| 5,689,508 | 11/1997 | Lyles | 370/391 |
| 5,724,351 | 3/1998 | Chao et al. | 370/395 |

OTHER PUBLICATIONS

Chao, H. Jonathan et al., "Design and Analysis of a Large–Scale Multicast Output Buffered ATM Switch," IEEE/ACM Transactions on Networking, vol. 3, No. 2, Apr. 1995, pp. 126–138.

Chao, H. Jonathan, "A Recursive Modular Terabit/Second ATM Switch," IEEE Journal on Selected Areas in Communications, vol. 9, No. 8, Oct. 1991, pp. 1161–1172.

Arakawa, N., A. Noiri, and H. Inoue, "ATM Switch for Multi–Media Switching System," Proceedings of the International Switching Symposium on Innovations in Switching Technology, Stockholm, Sweden May 28–Jun. 1, 1990, vol. v, pp. 9–14.

*Primary Examiner*—Chau Nguyen
*Assistant Examiner*—Kenneth Vanderpuye

[57] ABSTRACT

A self-arbitrating and self-routing ATM (Asynchronous Transfer Mode) switch has a switching fabric consisting of rows and columns of logic groups. The rows of logic groups have addressing logic for routing data packets received at input ports to the columns of logic groups. Arbitration logic in each of the columns of logic groups route data packets received from the addressing logic to their specified output ports. The arbitration logic forming each column of logic groups resolves conflicts between data packets contending for an identical output port. Additional logic in each column of logic groups signals input ports when data packets are successfully received by their specified output ports. Data packets which lose arbitration during a switch cycle are assigned a higher priority and retransmitted to the switching fabric during the next switch cycle.

24 Claims, 13 Drawing Sheets

SELF-ARBITRATING CROSSBAR SWITCH

The present invention relates generally to high speed communication networks, and more particularly, to a self-arbitrating crossbar switch suitable for use as a switching fabric in an ATM (Asynchronous Transfer Mode) switch.

BACKGROUND OF THE INVENTION

The ATM (Asynchronous Transfer Mode) protocol is an example of a packet switched network protocol that supports a plurality of communications services such as voice, video, and data. Information is transmitted over a network of ATM switches using fixed-sized data packets called cells. Routing information that is used to direct a data packet to its destination is contained in the header of the data packet. The data packet is examined at call setup time to determine a fixed route through the network of ATM switches. Depending on the particular fixed route defined, a data packet may travel through a series of cascaded switches before arriving at its destination.

A data packet received at an input port of a switch is routed by a switching fabric to an output port of the switch, with this output port being defined by the data packet's routing information. The switching fabric of a switch may have the property of being "non-blocking" and/or "self-routing", as well as other features that are not especially relevant to the following discussion. A non-blocking switching fabric is capable of generating all possible permutations of the inputs to the outputs. A self-routing switching fabric uses destination information that is included in a data packet to determine the route through the switching fabric.

Switching fabrics that are "non-blocking" tend to be difficult to scale to a large number of input ports and output ports. For example, crossbar switches have switching fabrics that directly connect each input port to each output port and are therefore non-blocking. However, these switches have the disadvantage of having the area of the cross bar fabric grow by the square of the number of ports. In contrast, the general architecture of a Batcher-Banyan fabric which includes a Batcher sorting network and a Banyan routing network, asymptotically requires less circuitry as the number of input ports and output ports of the switching fabric increases than the aforementioned cross bar switch architecture. However, this reduction in circuitry results in the Batcher-Banyan switching fabric being more complicated and increases the difficulty in fault isolation relative to a crossbar fabric.

In addition to a switching fabric, a switch typically includes an arbiter for providing organized access to the output ports of the switching fabric. The arbiter's function in a switching fabric that routes no more than one data packet to each output port per switch cycle, is to resolve contention among output ports when more than one input port attempts to access the same output port during a single switch cycle. Contention for output ports is known to produce head of line blocking in input queued switches and to reduce throughput. It is well known that output port contention can be reduced by adding a speedup factor of "k" which enables each output port to receive up to "k" data packets per switch cycle. In an ATM switch with a switching fabric having a speedup factor of "k", however, the arbiter must still resolve contention among input ports when the number of data packets destined to any one output port exceeds "k".

An example of a distributed arbiter that resolves conflicts between input ports contending for identical output ports is a reservation ring, an example of which is disclosed in U.S. Pat. No. 5,511,070. A reservation ring can be implemented using a linear systolic array of evaluators where each evaluator performs arbitration functions with its immediate neighbor. Each evaluator on the ring arbitrates for a specified input port during an arbitration cycle. Such a distributed arbiter advantageously utilizes the time necessary to send the fifty-three bytes of an ATM cell through the switching fabric to identify which cells to route during the next switch cycle. Even though distributed arbiters such as the reservation ring scale linearly, they do not scale well as the number of input ports and the bandwidth of the switching fabric increases because any given reservation request must be shifted through each evaluator on the reservation ring in one cell time.

It would be advantageous, therefore, to provide a new and improved switching fabric that is readily scaleable and capable of performing well with increasing bandwidth. In addition, it would be advantageous to provide a self-arbitrating switching fabric that has a unified architecture which incorporates an arbiter function into a switching fabric. Accordingly, this unified architecture would be readily scaleable between a varying number of input ports. Furthermore, such a unified architecture would have the advantage of being simple and small so that its circuit area is minimized. This small size would also advantageously make the switching fabric economical to manufacture.

SUMMARY OF THE INVENTION

In accordance with the invention, there is provided a switch for routing data packets with destination addressing information and priority information. The switch includes a plurality of input ports for receiving data packets from input sources and a plurality of output ports for transmitting data packets to output destinations.

In accordance with one aspect of the invention, a network of logic groups route data packets received at the plurality of input ports to the plurality of output ports. The network of logic groups form intersecting rows of logic groups and columns of logic groups. The rows of logic groups include logic for sorting data packets received at the plurality of input ports according to their destination addressing information, and the columns of logic groups include logic for ordering data packets sorted by their destination addressing information according to their priority information to determine which data packets received at the input ports to present to the output ports.

In accordance with another aspect of the invention, each logic group resides in a unique row of logic groups and a unique column of logic groups. Each row of logic groups includes logic for matching destination addressing information of a data packet transmitted from an input port coupled thereto with addresses of the plurality of output ports. Each column of logic groups includes logic for routing up to "k" data packets received from intersecting rows of logic groups to an output port coupled thereto. The rows and columns of logic groups include logic for identifying data packets successfully routed to the output ports of the switch.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. System Overview

Figure 1:
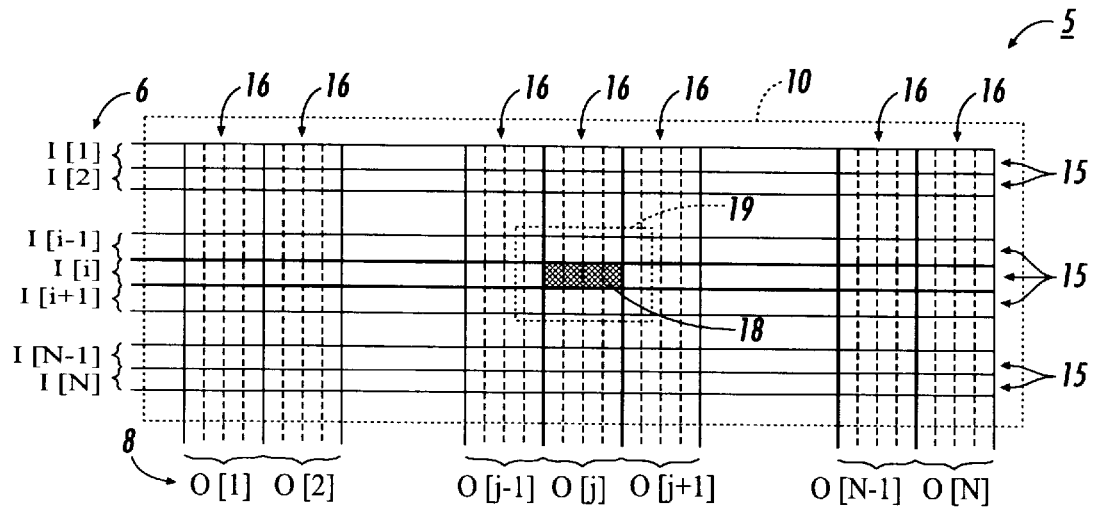
FIG. 1 illustrates the organization of the switching fabric of a switch incorporating the present invention.

Referring now to the drawings where the showings are for the purpose of describing an embodiment of the invention and not for limiting same, the Figures illustrate a self-routing, self-arbitrating ATM switch 5 incorporating the present invention. The switch 5 is adapted to route fixed sized data packets, called "cells", from input ports 6 to output ports 8 through a cross-bar switching fabric 10. Before an ATM cell enters the switching fabric 10, an input source (not shown) causes a fixed route, known as a "virtual circuit", to be determined for transferring the cell from its source to its destination. One way for a cell to be routed through a network of switches is with a hop-by-hop addressing scheme. According to this addressing scheme once a cell is received at an input port of switch 5, a virtual circuit identifier (VCI) from the cell's header is used to identify, in a VCI table, a replacement VCI and an output port address. The output port address identified from the VCI table for a cell specifies which output port 8 to route the cell through the switching fabric 10.

It will be appreciated by those skilled in the art that the switch 5 embodying the present invention is not limited to operating in an ATM network but instead can be modified to operate in most packet switched networks. It will also be appreciated that the present invention does not require the switch 5 to route fixed-sized data packets (i.e., ATM cells) but instead can route data packets with a varying size.

FIG. 1 illustrates the organization of the switching fabric 10 of the switch 5. The switching fabric 10 is organized in an "N×N" array of input rows 15 and output column groups 16, where "N" is an integer. Each of the N input rows 15 is coupled to an input port 6 (i.e. I[1] . . . [N]), and each of the N output column groups 16 is coupled to an output port 8 (i.e. O[1] . . . O[N]). At the intersection of each input row 15 and output column group 16 is a logic group 18. Each logic group 18 in the switching fabric 10 comprises addressing logic, arbitration logic (or routing logic), and acknowledgment logic. In general, the addressing logic identifies whether a data packet is destined to the output port to which its output column group is coupled; the arbitration logic resolves conflicts between input ports contending for identical output ports during a switch cycle while routing data packets to their specified output ports; and the acknowledgment logic provides a signal to an input port indicating whether its data packet was successfully routed to its specified output port(s). A switch cycle is defined herein to have sufficient bit cycles to deliver a data packet through the switching fabric from an input port 6 to an output port 8.

Figure 2:
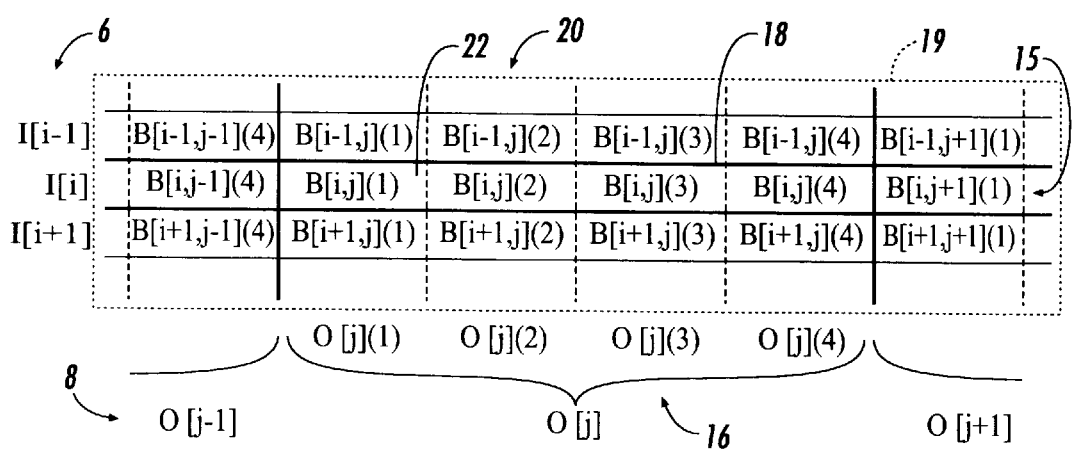
FIG. 2 illustrates the general organization of the logic groups identified by reference number 19 in FIG. 1.

FIG. 2 illustrates the general organization of the logic groups 18 identified by reference number 19 in FIG. 1. Specifically, each logic group 18 consists of a set of logic blocks B[i,j](1), B[i,j](2), B[i,j](3), and B[i,j](4). Each logic block 22 in the switching fabric 10 is addressable by the indices "i", "j", and "m", where "i" identifies an input port 6 coupled to an input column 15, "j" identifies an output port 8 coupled to an output column group 16, and "m" identifies an output column 20 of an output column group (i.e. B[i,j](m)). Input ports 6 include buffers for storing data packets received from an input source until a confirmation is received that the data packets have been successfully routed to their specified output ports.

It is well known that head of queue blocking at input ports 6 can cause a gross degradation in the overall throughput of a switch. U.S. Pat. No. 5,305,311 discloses the notion of speeding up each output port by a factor of "k" each switch cycle to minimize head of queue blocking. This "k" speedup per output port increases throughput from approximately 58% for k=1 (i.e. a switch with only input queuing) to approximately 89% for k=2 and nearly 100% for k=4 and above. The present invention achieves a speed up by defining each output column group 16 with "k" output columns 20, as illustrated in FIGS. 1 and 2. That is, each output port 8 is coupled to "k" output columns 20, and is, therefore, able to receive up to "k" data packets each switch cycle. Specifically, each output port 8 is coupled to "k" output columns 20 that are defined herein as O[j](1), O[j](2), . . . O[j](k). Accordingly, a switching fabric with "k" output columns has "k" logic blocks 22 (i.e. B[i,j](1) . . . B[i,j](m) . . . B[i,j](k)) per logic group 18. In addition, output ports 8 include buffers for queuing data packets that are simultaneously received over output columns 20 at an output port during a switch cycle. The buffers insure that when more than one data packet is received during a switch cycle at a single output port, some of these data packets can be stored until they are sent over an adjoining link of the network (not shown).

Figure 3:
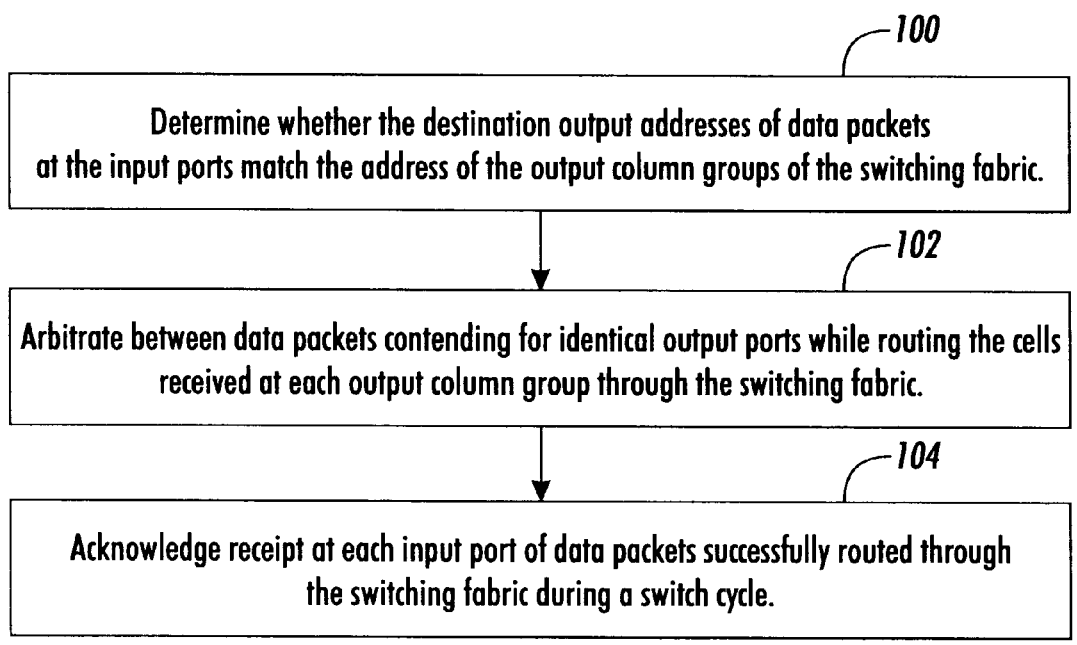
FIG. 3 is a flow diagram that sets forth three phases of operation of the switching fabric.

FIG. 3 is a flow diagram that sets forth three phases of operation of the switching fabric 10. Initially at step 100, the switching fabric 10 operates in an addressing phase during which specified output addresses of data packets buffered at input ports 6 are matched with addresses of output column groups 16. At step 102, the switching fabric operates in a routing or arbitration phase. During the arbitration phase data packets with addresses that match an output column group 16 arbitrate for the output port 8 to which the output column group is coupled. At step 104, the switching fabric 10 operates in an acknowledgment phase during which input ports receive a signal indicating whether a data packet was successfully transmitted to a specified output port(s). Those data packets which are not successfully routed to their specified output port(s) are resubmitted to the switching fabric 10 during the next switch cycle. Embodiments detailing each of the three phases of operation are discussed in turn below.

B. Addressing Logic

Figure 4:
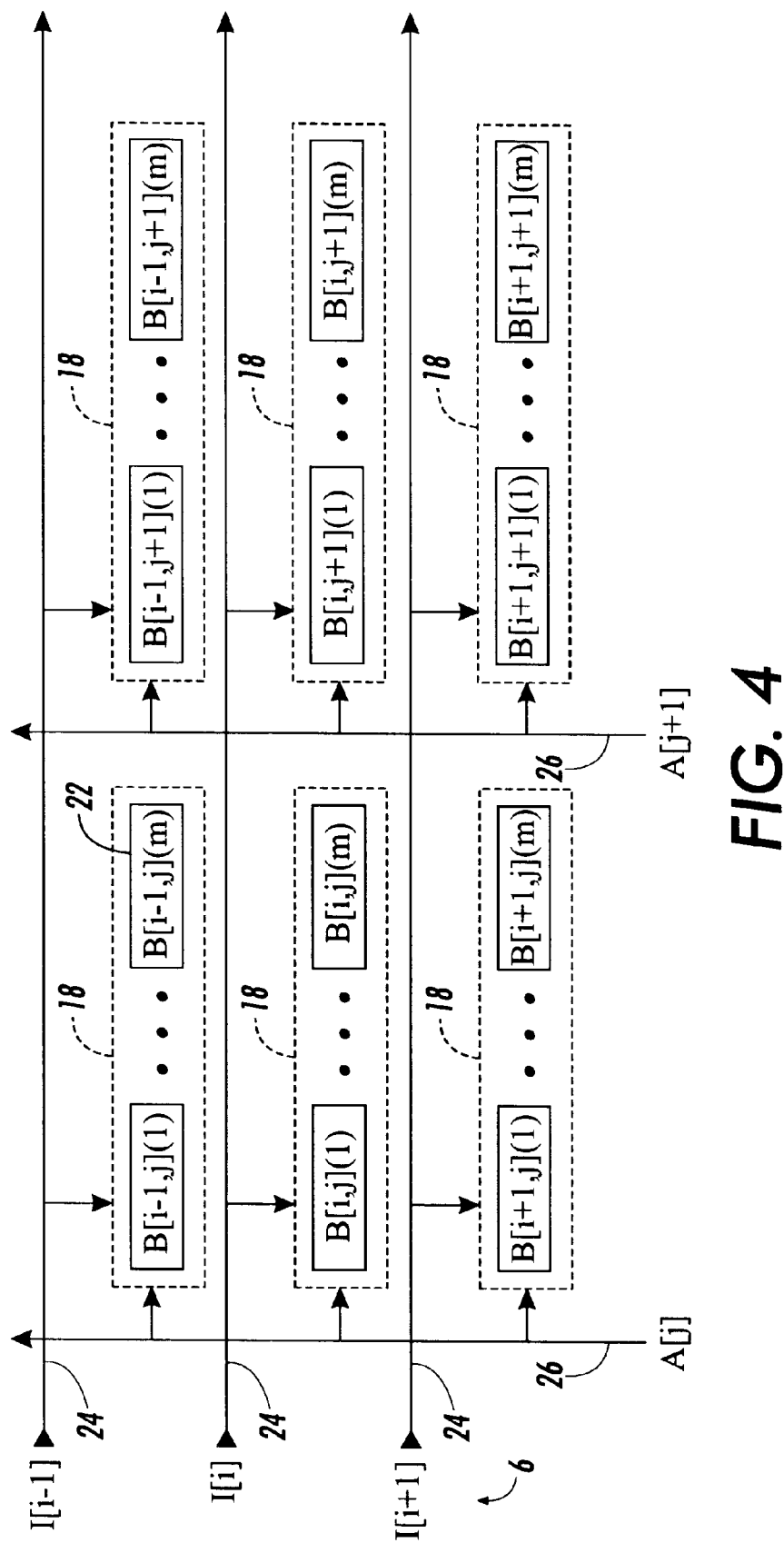
FIG. 4 illustrates a block diagram of connections between logic blocks for performing the addressing phase of the switching fabric.

FIG. 4 illustrates a block diagram of connections between logic blocks 22 that include addressing logic for performing the addressing phase of the switching fabric 10. At the start of a switch cycle data packets received from input sources and stored at input ports 6 are synchronously presented to the switching fabric 10. As set forth above, the routing information which is set forth in a data packet's header is used to identify in a VCI table a specified output port(s) 8 of the switch 5 to which the data packet is to be routed. Data packets may be routed to one or more output ports 8 depending on whether the data packet is a multicast or a unicast data packet. Modifications to the switch 5 that are necessary for supporting multicast data packets are described below in Section F.

During the addressing phase, output port address of each data packet sent serially on the input lines 24 are matched against the address (e.g. A[j]) of each output column group 16 sent vertically on address lines 26. More specifically, during the addressing phase each input port 6 serially transmits an output port address vector, a priority vector, and a data packet such as an ATM cell over input lines 24. Each input line 24 in the switching fabric is coupled to an input port and a logic group 18 from each output column group 16 to form an input row 15. Input ports 6 with no buffered data packets at the start of a switch cycle transmit idle packets with an output port address vector that does not match any of the addresses of the output ports 8 of switch 5. Simultaneously while each input port 6 transmits an address vector along input lines 24, each output ports 8 serially transmits an address vector with its address along an address line 26 (e.g. [j]). Each address line 26 couples a logic group 18 in each input row 15 with an output port 8. While simultaneously receiving an address vector over an input line 24 and an address line 26, each logic group 18 determines whether the output port addresses are equal. In an alternate embodiment with no address lines 26, this determination is made by matching an address vector received over input lines 24 with an address vector that is embedded in the logic group 18. The embedded address vector in each logic group 18 corresponds to the address of the output port to which it is coupled.

Figure 5:
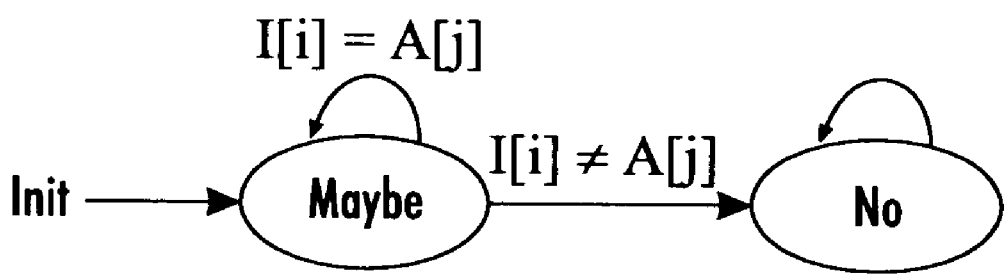
FIG. 5 defines different states of a state machine operating in each logic block when the switching fabric is in the addressing phase of operation.

FIG. 5 defines different states of a finite state machine operating in each logic block 22 when the switching fabric 10 is in the addressing phase of operation. As FIG. 5 illustrates, there are two states (i.e., the "MAYBE" state and the "NO" state) in which a logic block 22 can enter after being initialized at the start of a new switch cycle to the "MAYBE" state. After initialization, the "k" logic blocks 22 in a logic group 18 do not transition from the "MAYBE" state when the address bits transmitted horizontally on input lines 24 match the address bits transmitted on address lines 26 (i.e. I[i]=A[j]). However, the "k" logic blocks 22 in a logic group 18 transitions to the "NO" state when the address bits are no longer equal (i.e. I[i]≠A[j]). A more detailed description of a finite state machine for implementing the addressing phase of the switching fabric is disclosed in U.S. Pat. No. 5,602,844, which is incorporated herein by reference.

For example, assume input port I[i] transmitted the binary address vector "1010" and the address line A[j] transmitted binary address vector "1011" during the addressing phase. Since the address vectors in this example have four bits, the length of the address phase takes four bit cycles to complete. In operation, the input port I[i] and the address line A[j] transmit an address bit each bit cycle starting with the most significant bit to a logic block 22 coupled thereto. In this example, the finite state machine in the logic block 22 would remain in the "MAYBE" state until the least significant bit is received at which time the state machine transitions to the "NO" state. However, if the addresses were equal the state machine would have remained in the "MAYBE" state.

C. Arbitration Logic

As set forth above, each input port serially transmits during a switch cycle an output port address vector, a priority vector, and a data packet. After the addressing phase of a switch cycle, an output port address vector from each input port has been transmitted to each logic group 18. During the arbitration phase of the switch cycle, a priority vector is received and evaluated by each logic group.

A value indicating the priority of a data packet is designated at the start of a switch cycle and inserted in a priority vector that is transmitted following the address vector. An initial priority value is specified in the priority vector from a priority metric set forth in the header of the data packet. For example, ATM cell headers include a priority metric that indicates different classes of traffic. These different classes of traffic distinguish, for example, between real time traffic and best effort traffic. If a data packet is unsuccessfully routed through the switching fabric during a switch cycle, the priority value in the priority vector is increased or otherwise modified for that data packet during the next switch cycle before being resubmitted to the switching network.

Figure 6:
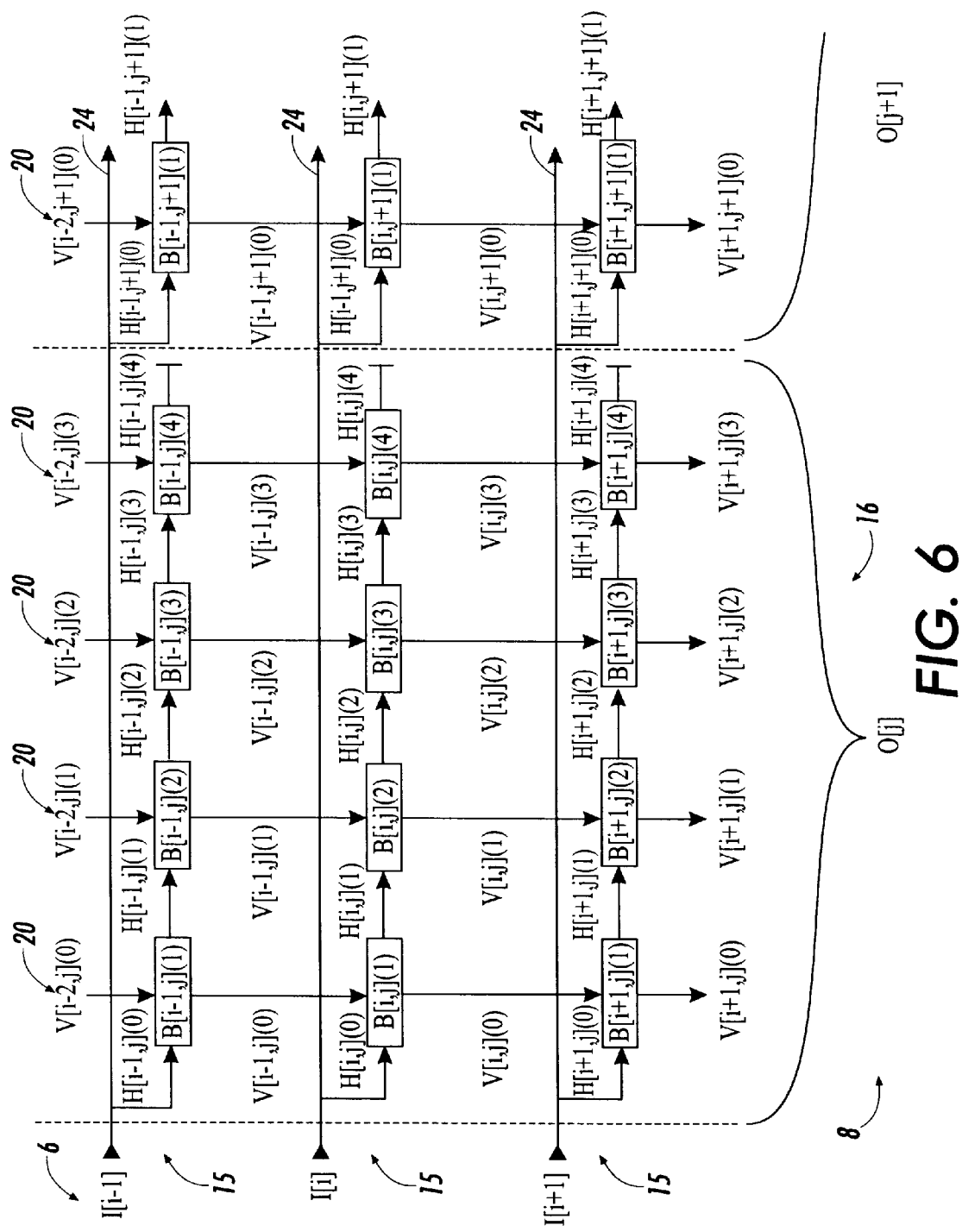
FIG. 6 illustrates a block diagram of the connections between logic blocks for performing the arbitration phase of the switching fabric.

FIG. 6 illustrates connections between logic blocks 22 that include arbitration logic for performing the arbitration phase of the switching fabric 10. Data packets that are successfully addressed to an output column group 16 during the addressing phase are routed vertically during the arbitration phase along an output column 20 unless a data packet with a greater priority is encountered. When two priority vectors of two data packets meet at a logic block 22, the priority vector of the two data packets with the greater priority is routed vertically along an output column 20 while the data packet with the lower priority is routed horizontally within a logic group 18. This vertical and horizontal routing sorts data packets with identical output port address according to their designated priority.

Figure 7:
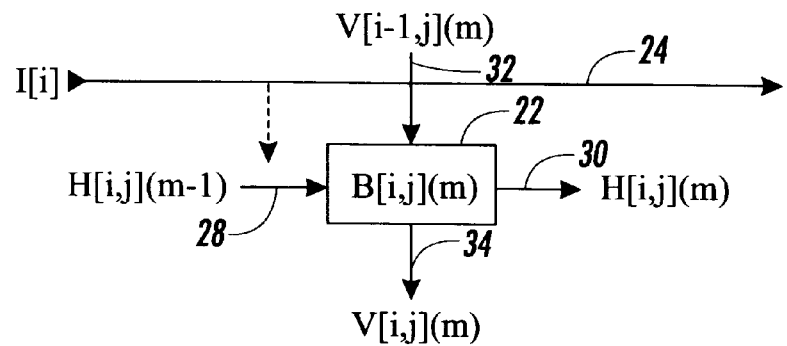
FIG. 7 illustrates a single logic block and its connections that operate during the arbitration phase.

FIG. 7 illustrates a single logic block 22 and its connections that operate during the arbitration phase. A logic block 22 (i.e., B[i,j](m)) has an input horizontal connection 28 (i.e., H[i,j](m−1)) and an output horizontal connection 30 (i.e., H[i,j](m)). The logic blocks 22 in a logic group 18 are connected horizontally in series to form part of an input row 15 as shown in FIG. 6. However, these horizontal connections 28 and 30 between logic blocks 22 do not extend beyond each output column group 16. Specifically, the leftmost input horizontal connection 28 within an input row 15 (e.g., H[i,j](0)) is coupled to input line 24 and the rightmost output horizontal connection 30 within an input row 15 (e.g., H[i,j](4)) terminates. In addition, the logic block 22 in each output column 20 are connected in series between logic groups 18 by an input vertical connection 32 (i.e., V[i,j](m−1)) and an output vertical connection 34 (i.e., V[i,j](m)). These vertically connected logic groups form an output column 20 as shown in FIG. 6.

With reference again to FIG. 6, during the arbitration phase contention is resolved among output ports 8 when more than one input port 6 attempts to route data packets to an identical output port during a single switch cycle. Each output column group 16 serves as an independent arbiter for the output port coupled thereto. In other words, each output column group 16 individually arbitrates among data packets destined for a single output port during the arbitration phase. In sum, the addressing phase and the arbitration phase sequentially sort data packets according to output port address and data packet priority, respectively, to identify those data packets which are routed to the output ports during a switch cycle.

More specifically, a data packet transmitted from input port I[i] with an output port address that matches the address of the output column group O[j] during the addressing phase is initially routed during the arbitration phase to logic block B[i,j](1). At each logic block 22 in an output column 20, a determination is made whether to route the data packet horizontally or vertically. If a data packet is routed or shifted horizontally more than "k" logic blocks 22, then the data packet is not successfully routed to its specified output port because the output horizontal connection 30 of the "k"th logic block 22 in a logic group 18 terminates (e.g. H[i,j](4)). That is, a data packet which is routed horizontally from logic block B[i,j](4) is dropped during the current switch cycle and retransmitted during the next switch cycle. As set forth above, the priority of a data packet that is unsuccessfully routed during the current switch cycle is increased during the next switch cycle in order to improve the likelihood that the data packet reaches its specified output port.

Figure 8:
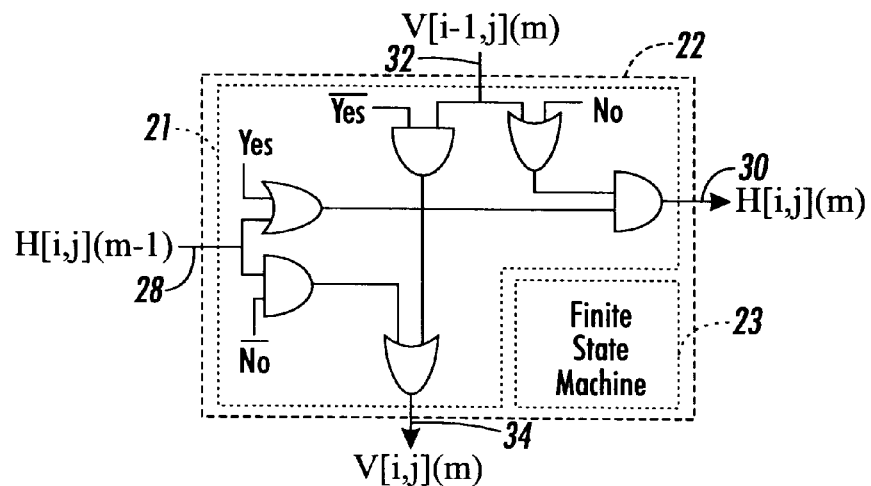
FIG. 8 illustrate combinatorial logic and a finite state machine in a logic block of the switching fabric for performing the arbitration phase.
Figure 9:
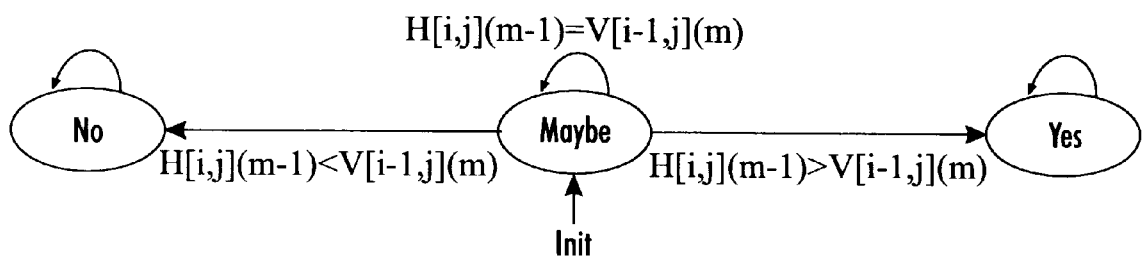
FIG. 9 illustrates a state transition diagram for the finite state machine shown in FIG. 8.

FIG. 8 illustrates combinatorial logic 21 and a finite state machine 23 that operate in each logic block 22 of the switching fabric 10 for performing the arbitration phase. FIG. 9 illustrates a state transition diagram for the finite state machine 23 shown in FIG. 8. As shown in FIG. 9, the combinatorial logic 21 operates in one of three states depending on the current state of the finite state machine 23. The three states of the finite state machine 23 are "NO", "MAYBE", and "YES". The finite state machine is initialized to the "MAYBE" state. The "MAYBE" state exists because it may not always be possible for a logic block 22 to immediately determine which data packet has a higher priority since the priority vector of a data packet is sent serially along input lines 24. Thus, a logic block 22 will remain in the "MAYBE" state as long as the priority bits received from the horizontal and vertical connections are identical. When the finite state machine 23 is in the "NO" or "YES" state, the priority of a data packet routed vertically along input vertical connection 32 (i.e. V[i,j](m−1)) and horizontally along input horizontal connection 28 (i.e. H[i,j](m−1)) has been determined.

In the intermediate "MAYBE" state, when a priority determination cannot be made, the combinatorial logic 21 shown in FIG. 8 immediately arbitrates and routes the current priority bit before the next transition of the finite state machine 23. If at the end of the arbitration phase a state machine continues to be in the "MAYBE" state, then the data packet routed vertically has an identical priority as the data packet routed horizontally. Such ties in priority between data packets are broken in favor of horizontally routed cells by transitioning the state machine from the "MAYBE" state to the "YES" state after completely receiving the data packet priority vectors. Alternatively, it will be understood by those skilled in the art that priority ties could also be broken in favor of vertically routed cells.

Figure 10:
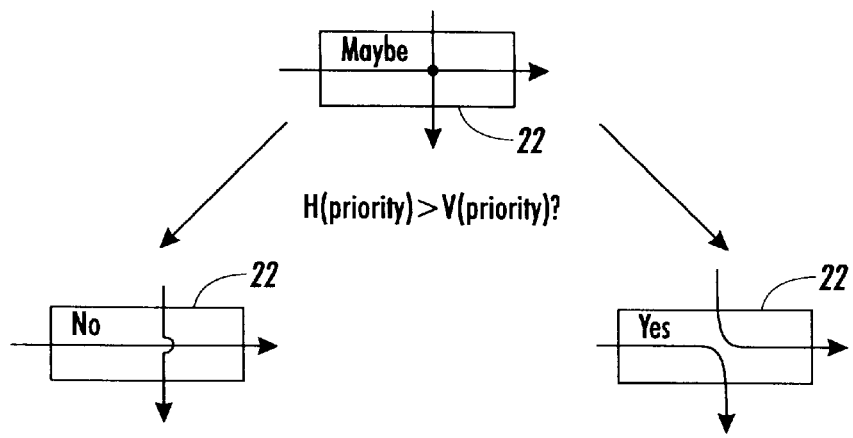
FIG. 10 illustrates virtual connections created in a logic block for each of the three states of the finite state machine shown in FIG. 9.
Figure 11:
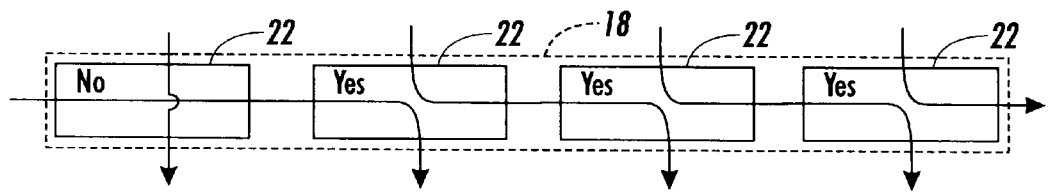
FIGS. 11 and 12 illustrate examples of combinations of logic blocks in a logic group that route data packets horizontally and vertically during an arbitration phase.
Figure 12:
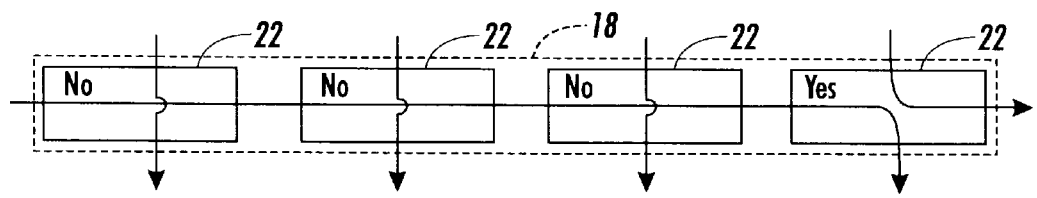

In summary, FIG. 10 illustrates virtual connections created in a logic block 22 for each of the three states of the finite state machine 23 (i.e. MAYBE, NO, and YES). In the "MAYBE" state when no determination of priority has been made, bits from vertically routed and horizontally routed data packets are directed both horizontally and vertically since they are identical. Once a determination of priority is made between a horizontally routed data packet and a vertically routed data packet, the state machine 23 transitions to a "NO" state or a "YES" state. In the "NO" state, the combinatorial logic 21 shown in FIG. 8 defines a virtual connection between the input horizontal connection 28 and the output horizontal connection 30, and a virtual connection between the input vertical connection 32 and the output vertical connection 34. In the "YES" state, the combinatorial logic 21 defines a virtual connection between the input horizontal connection 28 and the output vertical connection 34, and a virtual connection between the input vertical connection 32 and the output horizontal connection 30. FIGS. 11 and 12 illustrate examples of different logic blocks 22 that are combined in a logic group 18 to route data packets horizontally and vertically during the arbitration phase.

D. Acknowledgment Logic

Figure 13:
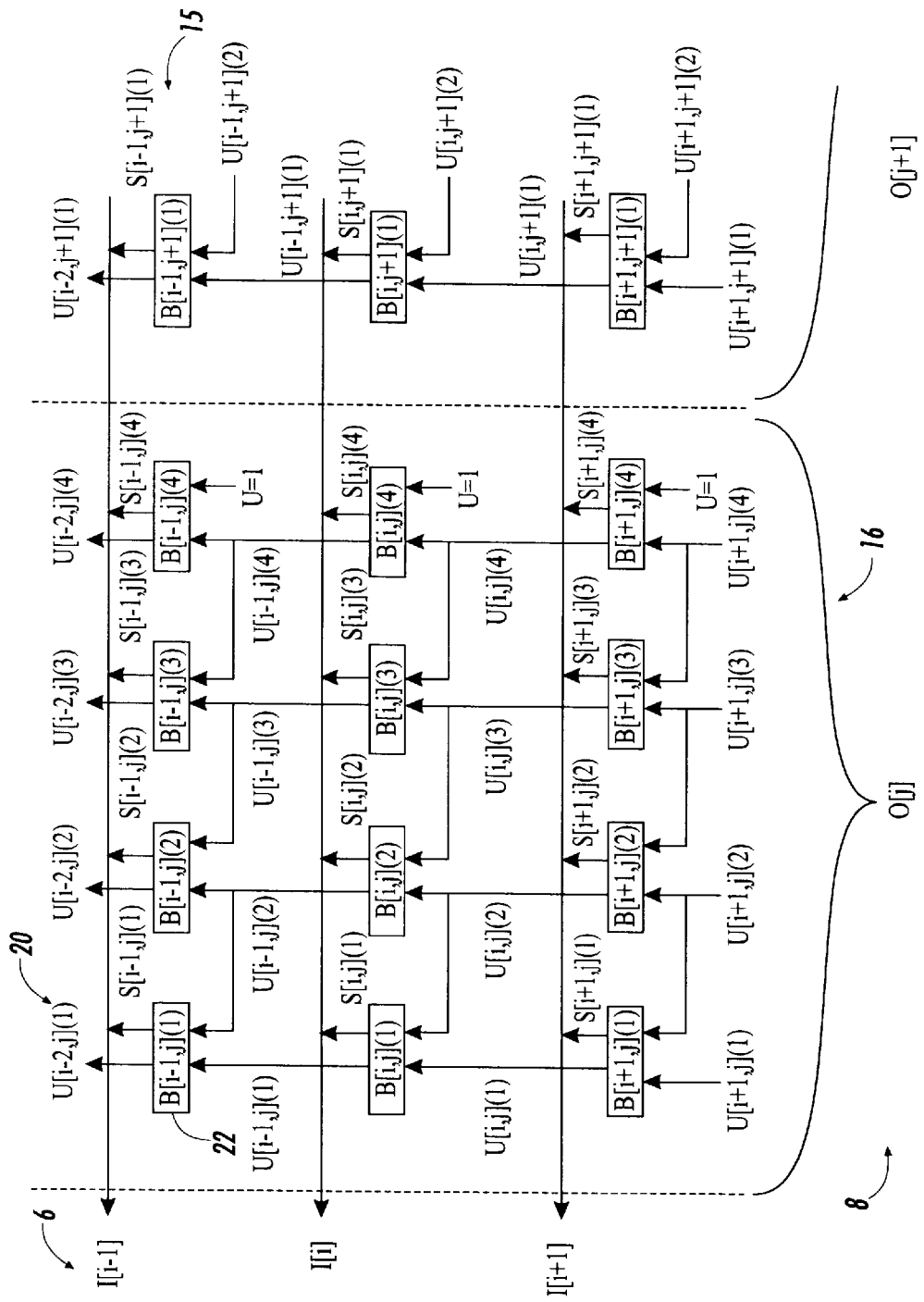
FIG. 13 illustrates a block diagram of connections between logic blocks of the switching fabric for performing the acknowledgment phase of the switching fabric.

FIG. 13 illustrates a block diagram of the connections between logic blocks 22 of the switching fabric 10 that operate during the acknowledgment phase of the switching fabric. After the end of the arbitration phase, an input port receives an acknowledgment signal that indicates the data packet was or was not successfully routed to a specified output port of the switch. That is, during the acknowledgment phase, an input port 6 receives a signal over acknowledgment line 38 indicating whether a data packet was successfully routed through the switching fabric 10 to its specified output port. The acknowledgment phase begins as soon as data packets received by the output column groups at the start of the arbitration phase have propagated to the input row having the largest index value (N), as shown in FIG. 1. Thus, the acknowledgment phase operates while the arbitration phase completes the routing of data from data packets that successfully gained access to an output port during the current switch cycle.

Figure 14:
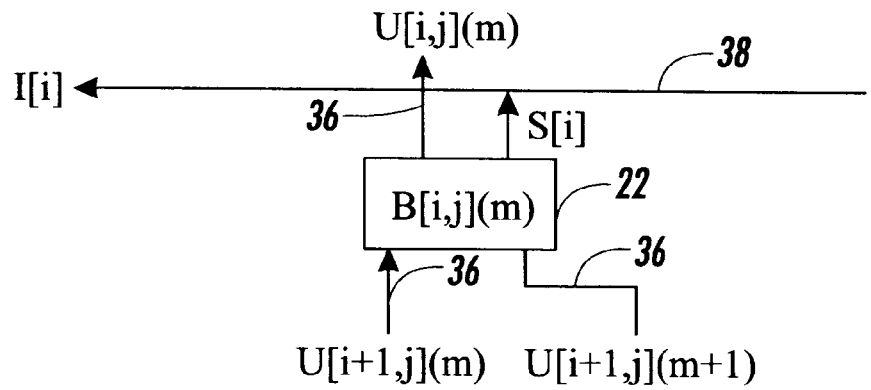
FIG. 14 illustrates a single logic block and its connections for performing the acknowledgment phase of the switching fabric.

FIG. 14 illustrates a single logic block 22 and its connections that operate during the acknowledgment phase of the switching fabric 10. Logic blocks 22 are coupled to each other in an output column group by vertical acknowledgment connections 36. In addition, each input port 6 is coupled to the logic blocks 22 in its input row 15 by horizontal acknowledgment line 38. For example, the input port I[i] receives an acknowledgment signal S[i] over acknowledgment line 38 equal to "1" when the data packet is properly routed to its destination output port. In contrast, the input port I[i] receives an acknowledgment signal S[i] that is equal to "0" when the data packet is unsuccessfully routed to its destination output port. Data packets which are unsuccessfully routed during a current switch cycle are resubmitted to the switching fabric 10 during the next switch cycle.

Figure 15:
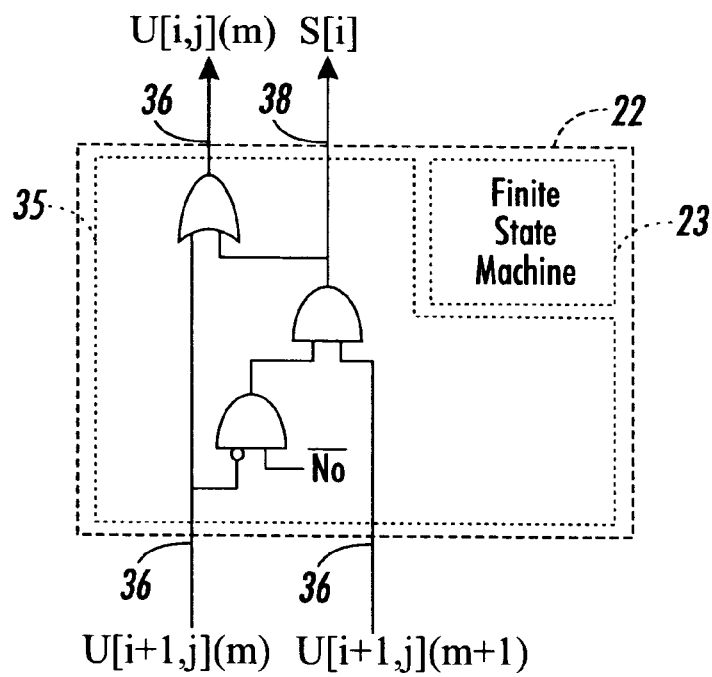
FIG. 15 illustrates combinatorial logic and finite state machine that operate in a logic block during the acknowledgment phase of a switching cycle.

FIG. 15 illustrates combinatorial logic 35 and finite state machine 23 that operate in a logic block 22 during the acknowledgment phase of a switching cycle. At the start of the acknowledgment phase, vertical signals "U" to the logic blocks in input row I[N] (i.e. the input row having the largest index value (N)) are initialized to "0". (Input row I[N] is the input row immediately coupled to output ports 8 of the switch 5 as shown in FIG. 1.) The combinatorial logic in each logic block 22 of the switching fabric 10 generates acknowledgment signals "S" for the "k" highest priority data packets that are successfully routed to their destination output ports during a switch cycle. In addition, the combinatorial logic insures that the vertical signals "U" are propagated to succeeding input rows 15 (i.e. I[N], I[N−1], I[N−2], . . . ). In operation, the signals remain "0" until they are converted into an acknowledgment signal S[i]. In other words, the horizontal acknowledgment signals "S" of an input port remains "0" until a logic group 18 in its corresponding input row 15 has a vertical signal "U" that transitions to "1". Furthermore, vertical "U=0" signals are converted into horizontal acknowledgment signals in right to left order, so that the "U" signals are always monotonic within a logic group.

Besides acknowledging the delivery of data packets to output ports 8, the acknowledgment logic can also serve as a form of output port flow control. Providing flow control, enables each output port 8 to independently limit the number of data packets that it receives during a switch cycle. For example, an output port 8 can use flow control to limit the number of data packets it receives during a switch cycle when its output port buffers are full. To use the acknowledgment logic as flow control, an output port initializes some or all of the "k" vertical signals "U" of the logic blocks in input row I[N] to "1" instead of "0", depending on the number of data packets the output port would like to accept during a switch cycle. The number of vertical signals "U" initialized to "0" of the logic block in input row I[N] dictates how many data packets an output port will receive during a switch cycle. When an output port accepts less than "k" data packets, the "k" vertical signals "U" in input row I[N] are initialized in a monotonic ordering of zeros to ones from left to right. This monotonic ordering insures that those data packets with the highest priority are received first.

As described above, the finite state machine 23 in each logic block 22 of an output column group 16 is either in the "YES" state or the "NO" state at the end of the arbitration phase. As shown in the two examples in FIGS. 11 and 12, the states of the logic blocks 22 dictate whether data packets that are routed in a column group are routed horizontally or vertically. Recall that data packets with a higher priority are routed vertically, and that data packets that are routed horizontally more than "k" logic blocks 22 during a switch cycle must be resubmitted during the next switch cycle.

In operation during the acknowledgment phase, the combinatorial logic 35 locates the rightmost vertical signal "U" in an output column 20 of a logic group 18 with a value equal to "0". Subsequently, if the state of the logic block is in the "YES" state, the combinatorial logic 35 changes the vertical signal "U" in that input row to a value equal to "1" and the acknowledgment signal "S" in that output column 20 to a value equal to "1". The combinatorial logic 35 of a logic block does not modify the vertical signal "U" or raise a horizontal acknowledgment signal "S" that is equal to "1" when a logic block is in the "NO" state. In effect, the combinatorial logic 35 insures that vertical signals "U" with a value that is equal to "0" in a logic group 18 are delivered to higher priority rows of the switching fabric 10.

In order for the arbitration phase to operate correctly with the combinatorial logic 35 shown in FIG. 15, the arbitration phase logic sorts contending data packets so that the states of logic blocks 22 in a logic group 18 define a monotonic sequence of "YES" and "NO" states (e.g. NO, YES, YES, YES—see FIGS. 11). Monotonic ordering insures that there are as many logic blocks in the "NO" state at the beginning of the sequence as there are data packets of higher priority with lower input indices destined to the same output port. As set forth above, logic blocks in a sequence of "YES" and "NO" states are in the "YES" state when cells of lower priority with lower input indices are displaced by the data packet in the current input row. The "YES" and "NO" states are monotonically ordered because all packets entering a logic group are sorted by priority. Because both the "YES" and "NO" states of a logic group 18, and the "U" states are ordered monotonically in the logic group 18, it is easy to compare the number of available output ports with the number of higher priority input ports with lower input indices.

Figure 16:
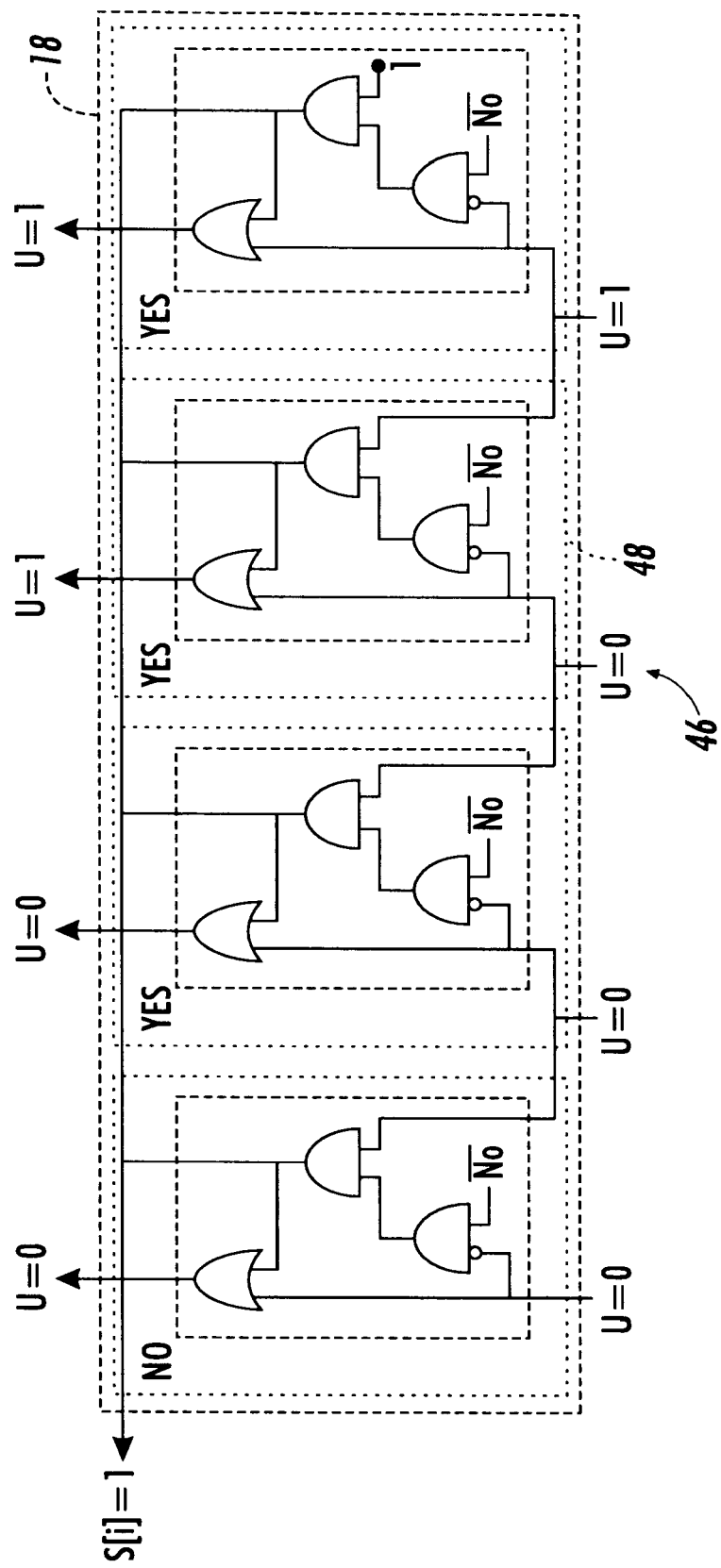
FIGS. 16 and 17 illustrate examples of two different logic groups after completing an arbitration phase.
Figure 17:
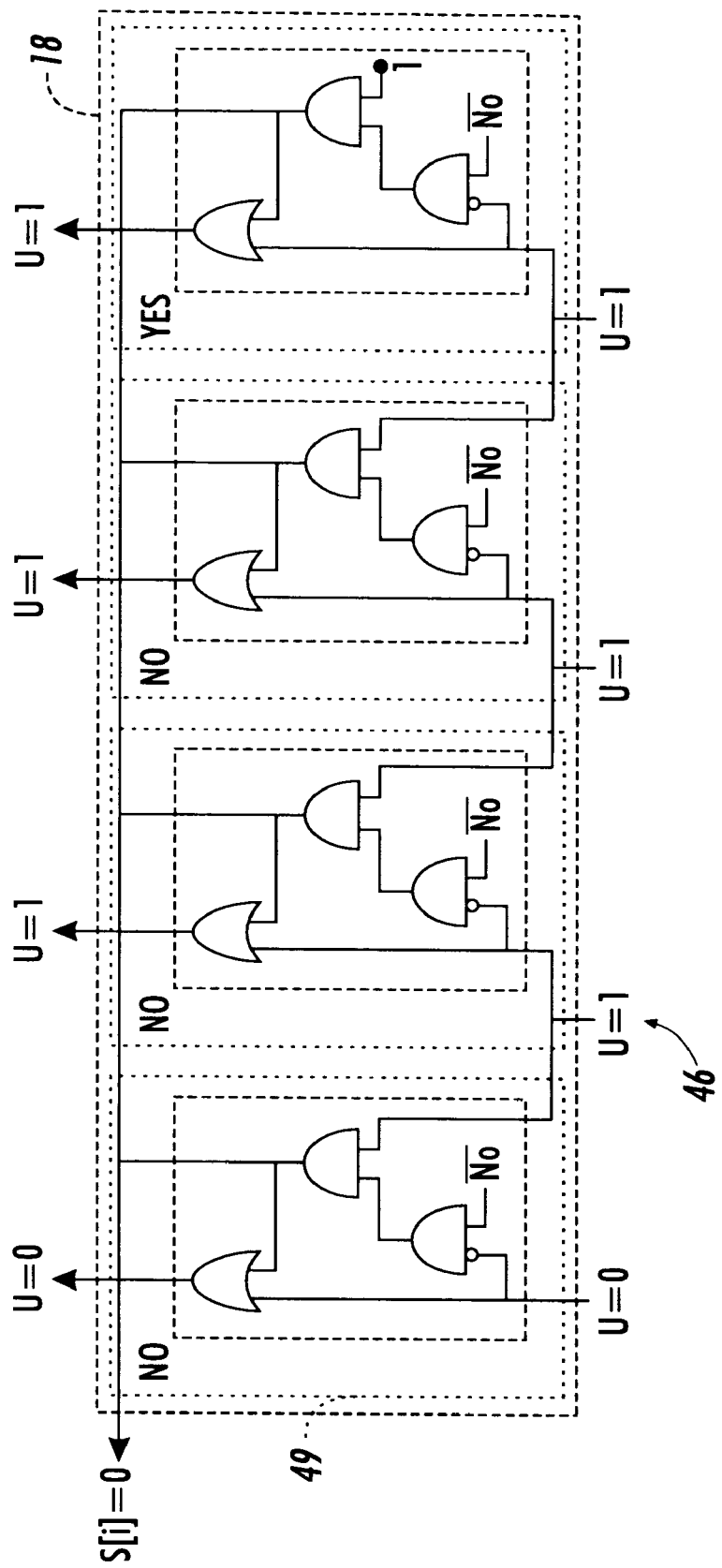

FIGS. 16 and 17 illustrate two different logic groups which have completed the arbitration phase. FIGS. 16 and 17 correspond to the logic groups shown in FIGS. 11 and 12, respectively, which have completed the arbitration phase. As set forth above initially, the rightmost input vertical signal "U" which has a zero value is located in the logic groups 18. This rightmost "U" signal is indicated by reference number 46 in FIGS. 16 and 17. FIG. 16 illustrates an example where a data packet from an input port coupled to acknowledgment line S[i] was successfully routed. Because the logic block indicated by reference number 48 is in the "YES" state, the horizontal acknowledgment signal "S" and the vertical signal "U" are modified from a value equal to "0" to a value equal to "1". In contrast, FIG. 17 illustrates an example where a data packet from input port coupled to acknowledgment line S[i] was unsuccessfully routed. Because the logic block with the rightmost vertical signal "U" (indicated by reference number 46) that is zero is input to a logic block (indicated by reference number 48) which is in the "NO" state, neither the horizontal acknowledgment signal "S" or the vertical signal "U" are modified from their original "0" value.

E. Alternate Embodiments That Compensate For Long Logic Paths In The Switching Fabric If the switch 5 has a large number of input ports then long logic paths may exist through the switching fabric 10. Long logic paths set an upper bound on the speed of the switch's operation. Delays caused by long logic paths may affect critical stages of the arbitration phase and cause errors in the operation of the switch if the upper bound on the speed of the switch is exceeded. For example, errors may occur if information has not fully propagated through the switching fabric 10 before the end of a bit cycle and the start of another. It is assumed, however, for the purposes of describing the embodiment above that long logic paths operate properly and are not affected by such data set up requirements.

Figure 18:
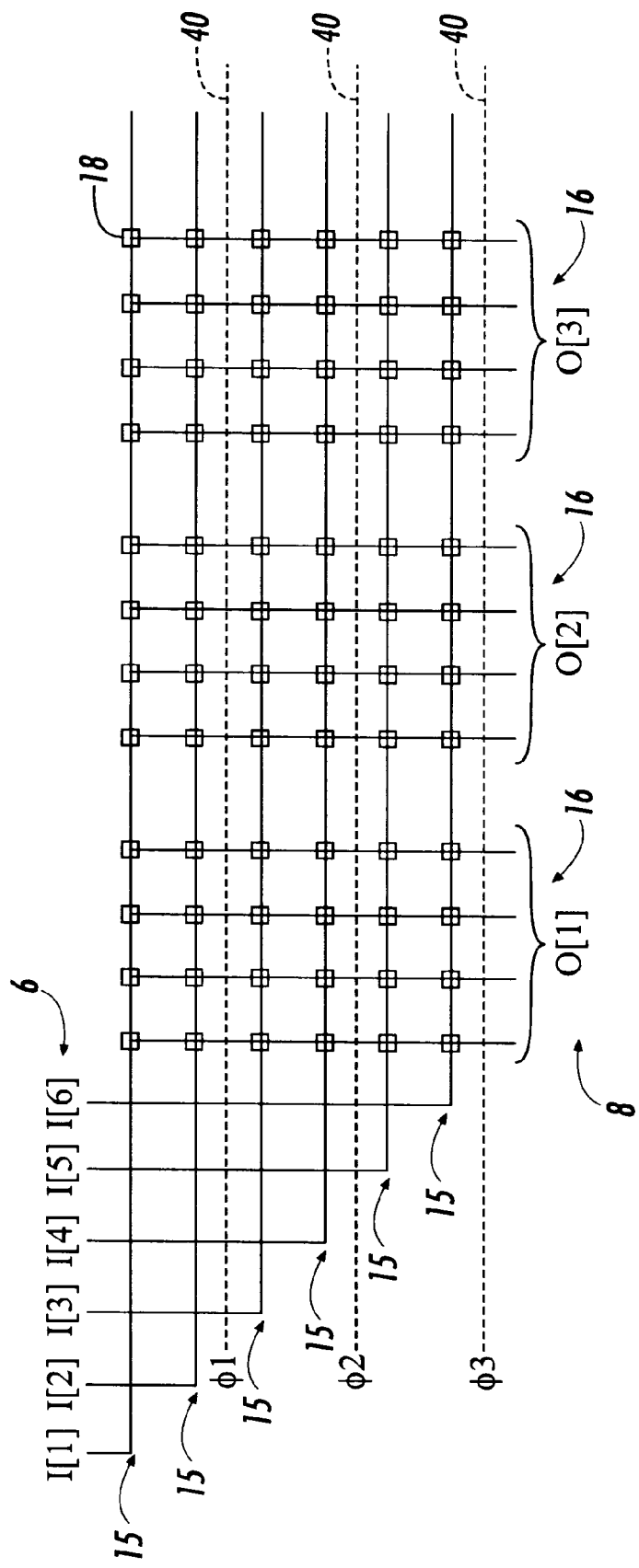
FIG. 18 illustrates a first embodiment that compensates for long logic paths with a flow-through technique that consists of inserting latches between every two input rows.
Figure 19:
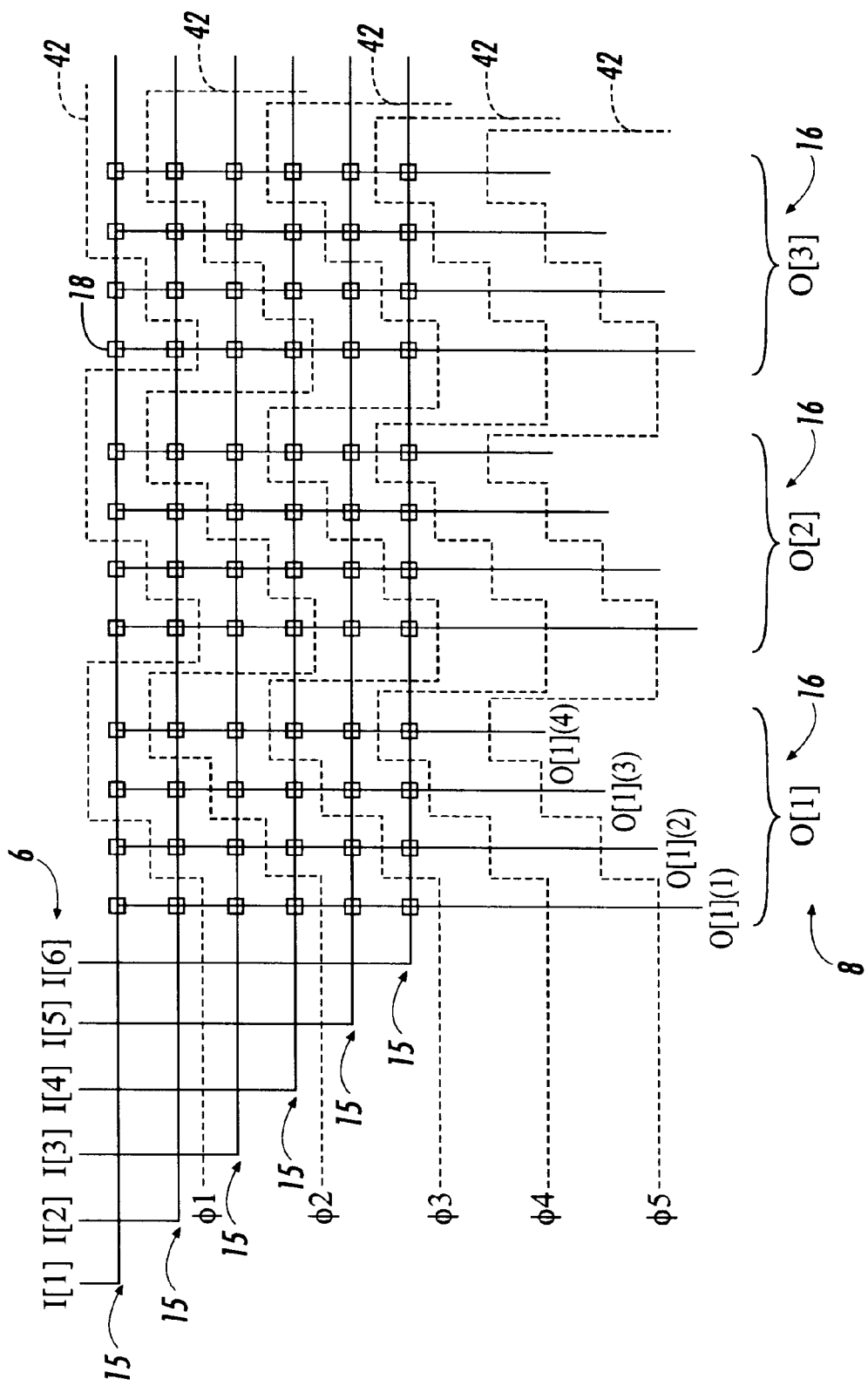
FIG. 19 illustrates a second embodiment that compensates for long logic paths with a flow-through technique that consists of inserting latches spaced at a consistent distance between logic blocks in the switching fabric.

Pipelining is introduced to the embodiment described above so that the upper bound set by long logic paths is not the limiting factor of the speed of the switch's operation. FIGS. 18 and 19 illustrate two embodiment that compensate for long logic paths with two different flow-through techniques. These embodiments differ from the embodiment shown in FIG. 6 which arbitrates between data packets contending for an identical output port for every input column 16 at the same time. FIG. 18 illustrates a first embodiment of a flow-through technique where latches, which are indicated generally by the dotted line 40, are inserted between every two input rows 15. In this first embodiment, the arbitration phase occurs earlier for lower index input ports (i.e. I[1]). For example, during the first phase (i.e. φ1) input rows 15 (e.g. I[1] and I[2]) arbitrate, and during the second phase (i.e. φ2) other input rows 15 (e.g. I[3] and I[4]) arbitrate.

FIG. 19 illustrates a second embodiment of flow-through technique where latches, which are indicated by dotted lines 42, are spaced a consistent distance between logic blocks 22 in the switching fabric. This second embodiment is preferred over the first embodiment shown in FIG. 18 because the distance between each data latch is equal whether data packets are routed horizontally or vertically. For example, during the first phase (i.e. φ1) parts of input rows 15 (e.g. O[1](1) and O[1](2) of I[1]) arbitrate, and during the second phase (i.e. φ2) other parts of input rows 15 (e.g. O[1](3) and O[1](4) of I[1]) arbitrate. In yet another embodiment not shown, data latches are spaced after every logic block 22, thereby defining the switching fabric entirely by a matrix of two-by-two switching elements.

Similarly, the acknowledgment logic shown in FIG. 13 may have long data paths that may cause problems similar set up problems. A carry-look-ahead technique is another technique that may be used to eliminate propagation delays created by long data paths. With a carry-look-ahead technique, the vertical signals "U" shown in FIG. 13, which are long paths of OR gates, can be accelerated with parallel paths of logic that OR the same signal across large groups of OR gates. Alternatively, the acknowledgment logic can be delayed several bit cycles for the propagation of the vertical signals "U" since the acknowledgment signal "S" can be raised late in a switch cycle.

F. Alternate Embodiments For Accommodating Multicast Traffic

Switch 5 can be adapted to route multicast data packets with one of the following alternate embodiments. Generally, a multicast data packet addresses one or more output ports. To accommodate delivery to more than one output port both addressing logic that identifies whether a data packet is destined to an output column group and acknowledgment logic that provides a signal indicating whether a data packet was successfully routed through the switching fabric, require some modification from the embodiment set forth above. However, no modification is required to arbitration logic that resolves conflicts between input ports contending for identical output ports during a switch cycle while routing data packets their destination ports.

The addressing logic which is set forth in FIGS. 4 and 5 can be modified to deliver data packets to more than one logic group 18 coupled by input line 24 in an input row 15. In the embodiment set forth above the destination port address transmitted across input line 24 is matched against the address of each output column group 16 sent vertically on address lines 26. In a first alternate embodiment, instead of transmitting one address at a time on input line 24, an array of addresses is transmitted. Alternatively, the array of addresses can be substituted with a bit vector, where each bit in the bit vector identifies one of the output ports 8 of the switch 5. It will be understood by those skilled in the art that an array of addresses could be longer than a data packet. To account for unreasonably long arrays of addresses, the arrays could be limited to accommodate no more than a predetermined fixed number of ports. Alternatively, the arrays can include a broadcast address which requires a data packet to be routed to every output port of the switch.

To accommodate multicast traffic, acknowledgment logic shown in FIGS. 13–15 must be adapted to selectively signal the specified output ports of the switch, if not all, to which data packets are successfully routed by the arbitration logic shown in FIGS. 6–9. In one embodiment, a pending bit is set in each logic group 18 at the start of a switch cycle during the addressing phase. The pending bit is used to identify whether a data packet addressed to an column of logic is successfully transmitted during the current switch cycle to the output port coupled thereto. If a data packet is addressed to an output port coupled to a logic group, then the logic group sets the pending bit equal to a value of "1"; otherwise, the pending bit is set equal to a value of "0". During the acknowledgment phase, the pending bit is set equal to a value of "0" for each corresponding destination output port to which a multicast data packet is successfully routed.

At the conclusion of the acknowledgment phase, instead of transmitting a single acknowledgment signal S[i] over horizontal acknowledgment connection 38, an "OR" operation is performed to the pending bits of a row of logic groups. The output of the "OR" operation is received by the input port coupled to the row of logic groups. If the output of the "OR" operation is equal to "0" then every output port successfully received a data packet for which the multicast packet was destined; otherwise, if the output of the "OR" operation is equal to "1" then the data packet was unsuccessfully delivered to every specified output port. Multicast data packets that are not successfully routed to one or more of the destination output ports are resubmitted to the switching fabric during the next switch cycle similar to unsuccessfully routed unicast data packets. Only those logic groups that continue to have the pending bit set equal to "1" are arbitrated during the next switch cycle during which a data packet is retransmitted to unsuccessfully routed output ports.

In an alternate embodiment that accommodates multicast traffic during the acknowledgment phase, bit vectors delivered during the addressing phase are returned during the acknowledgment phase with only the bits set for those data packets which were not successfully routed to destination output ports during the switch cycle.

H. Conclusion

In summary, the architecture of the switch incorporating the present invention can be advantageously used to develop large scale switches. This advantage can be realized because the switching fabric is regularly repeating. A regularly repeating fabric is ideal for custom implementations because the switch has the advantage of being readily scaleable to a varying number of ports. Furthermore, the switching fabric disclosed herein has the additional advantage that most connections between logic blocks 22 are local (e.g., input vertical connection 32, output vertical connection 34, input horizontal connection 28, and output horizontal connection 30). This advantage facilitates the tiling of logic blocks on the surface of a chip because an extensive number of non-local connections (e.g. input line 24) are not required between logic blocks.

It will be understood by those skilled in the art that the present invention does not require that data packets are serially transmitted through switching fabric; instead, the switching fabric can be modified to incorporate different degrees of parallelism. For example, input line 24 shown in FIG. 4 can include two lines so that addressing and arbitration can be pipelined with data transmission. One line is used to send the data for the current cell, while the other lines is used to perform addressing and arbitration for the next cell.

In addition, it will be understood by those skilled in the art that defining the input lines with a horizontal orientation and the output lines with a vertical orientation should not impose any physical limitations on the orientation of the input lines or output lines of the switch. For example, input lines could be oriented vertically and the output lines could be oriented horizontally.

Some aspects of the disclosed switch may be readily implemented in software using software development environments that provide portable source code that can be used on a variety of hardware platforms. Alternatively, the disclosed switch may be implemented partially or fully in hardware using standard logic circuits. Whether software or hardware is used to implement the switch varies depending on the speed and efficiency requirements of the switch and also the particular function and the particular software or hardware systems and the particular microprocessor or microcomputer systems being utilized. The switch, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A switch for routing data packets with destination addressing information and priority information, comprising:
   a plurality of input ports for receiving data packets from input sources and a plurality of output ports for transmitting data packets to output destinations; and
   a network of logic groups for routing data packets received at the plurality of input ports to the plurality of output ports; said network of logic groups forming intersecting rows of logic groups and columns of logic groups; wherein said network of logic groups further comprises:
      logic, in the rows of logic groups, for selecting output columns to receive data packets,
      logic, in the columns of logic groups, for ordering data packets according to their priority information to determine which data packets received at said input ports to present to said output ports, and
      logic, in the rows and columns of logic groups, for identifying data packets successfully routed to said output ports.

2. The switch according to claim 1, wherein each row of logic groups comprises logic for matching destination addressing information of a data packet transmitted from an input port coupled thereto with addresses of the plurality of output ports.

3. The switch according to claim 1, wherein each column of logic groups comprises logic for routing to an output port coupled thereto up to "k" data packets each switch cycle.

4. The switch according to claim 3, wherein "k" is equal to one.

5. The switch according to claim 1, wherein said logic for identifying data packets successfully routed to said output ports identifies data packets successfully routed using the ordering of data packets by the columns of logic groups.

6. The switch according to claim 1, wherein each column of logic groups comprises a plurality of columns of logic blocks for receiving at each output port up to "k" data packets each switch cycle.

7. The switch according to claim 6, wherein said network of logic groups further comprises a sorting element for sorting data packets by a predefined priority metric.

8. The switch according to claim 6, wherein said arbitration logic routes data packets with lower priority between columns of logic blocks and data packets with higher priority within a column of logic blocks.

9. The switch according to claim 8, wherein a data packet routed between the plurality of columns of logic blocks is resubmitted to said network of logic groups.

10. The switch according to claim 1, wherein the data packets are multicast data packets that include destination addressing information for accessing a plurality of output ports.

11. The switch according to claim 1, wherein the rows of logic groups include logic for matching the destination addressing information of a data packet with an address that identifies one of the plurality of output ports.

12. The switch according to claim 1, wherein said network of logic groups further comprises a data latch between each logic group for pipelining data packets.

13. The switch according to claim 1, wherein each output port controls how many data packets it receives during each switch cycle of said switch.

14. The switch according to claim 1, wherein the columns of logic groups monotonically order the data packets according to their priority information.

15. A switch for routing data packets with destination addressing information and priority information, comprising:
   a plurality of input ports for receiving data packets from input sources and a plurality of output ports for transmitting data packets to output destinations; and
   a network of logic groups for routing data packets received at the plurality of input ports to the plurality of output ports; said network of logic groups forming intersecting rows of logic groups and columns of logic groups; each logic group residing in a unique row of logic groups and a unique column of logic groups; each row of logic groups including logic for matching destination addressing information of a data packet transmitted from an input port coupled thereto with addresses of the plurality of output ports; each column of logic groups including logic for routing data packets received from intersecting rows of logic groups to an output port coupled thereto; the rows and columns of logic groups including logic for identifying data packets successfully routed to the output ports of said switch.

16. The switch according to claim 15, wherein each column of logic groups comprises a plurality of output columns for receiving at each output port up to "k" data packets each switch cycle.

17. The switch according to claim 16, wherein each logic group in the network of logic groups further comprises a state machine for determining whether a horizontally routed data packet has a greater priority than a vertically routed data packet.

18. The switch according to claim 17, wherein said state machine defaults to a predetermined state when the priority of the horizontally routed data packet is equal to the priority of the vertically routed data packet.

19. The switch according to claim 1, wherein said logic for identifying data packets successfully routed to said output ports orders data packets according to their priority information.

20. The switch according to claim 1, wherein said logic for identifying data packets successfully routed to said output ports further comprises means for controlling flow of data packets from said input ports.

21. The switch according to claim 1, wherein said logic for identifying data packets successfully routed to said output ports monotonically orders acknowledgment signals to insure data packets with a high priority are received at said output port before data packets with a low priority.

22. The switch according to claim 10, wherein said logic for selecting output columns further comprises logic for receiving an array of addresses.

23. The switch according to claim 22, wherein the array of addresses is a bit vector.

24. The switch according to claim 10, wherein said logic for identifying data packets successfully routed to said output ports identifies multicast data packets successfully routed to said output ports.

* * * * *

UNITED STATES PATENT AND TRADEMARK OFFICE
CERTIFICATE OF CORRECTION

| | |
|---|---|
| PATENT NO. | : 5,930,256 |
| APPLICATION NO. | : 08/829649 |
| DATED | : July 27, 1999 |
| INVENTOR(S) | : Daniel H Greene et al. |

It is certified that error appears in the above-identified patent and that said Letters Patent is hereby corrected as shown below:

Column 1, line 2, insert as a new paragraph:

This invention was made with Government support under DABT63-92-C-0034 awarded by DARPA. The Government has certain rights in this invention.

Signed and Sealed this

Twenty-fifth Day of March, 2008

JON W. DUDAS
*Director of the United States Patent and Trademark Office*